(12) United States Patent
Rogers (10) Patent No.: US 10,791,713 B1
(45) Date of Patent: Oct. 6, 2020

(54) STRAPLESS ANIMAL CHASTITY METHODS AND DEVICES

(71) Applicant: Maurice Rogers, Downsville, LA (US)

(72) Inventor: Maurice Rogers, Downsville, LA (US)

( * ) Notice: Subject to any disclaimer, the term of this patent is extended or adjusted under 35 U.S.C. 154(b) by 0 days.

(21) Appl. No.: 16/732,923

(22) Filed: Jan. 2, 2020

(51) Int. Cl.
*A01K 21/00* (2006.01)

(52) U.S. Cl.
CPC ................... *A01K 21/00* (2013.01)

(58) Field of Classification Search
CPC ....... A01K 23/00; A01K 23/005; A01K 21/00
USPC ....... 119/171, 172, 814, 838, 850, 854, 869, 119/868
See application file for complete search history.

(56) References Cited

U.S. PATENT DOCUMENTS

| | | | |
|---|---|---|---|
| 484,701 A * | 10/1892 | Chase | A01K 21/00 119/838 |
| 3,176,657 A | 4/1965 | Callaway | |
| 3,881,490 A * | 5/1975 | Whitehead | A61F 13/533 604/366 |
| 3,888,248 A * | 6/1975 | Moore | A61F 13/00021 602/43 |
| 4,133,297 A | 1/1979 | Denebeim | |
| 4,500,580 A * | 2/1985 | Luciani | E04F 13/08 428/131 |
| 5,423,737 A * | 6/1995 | Cartmell | A61F 13/023 602/57 |
| 5,501,661 A * | 3/1996 | Cartmell | A61F 13/023 424/443 |
| 5,922,470 A * | 7/1999 | Bracken | A61L 15/12 427/575 |
| 6,647,928 B1 | 11/2003 | Spiller | |
| 6,863,033 B1 * | 3/2005 | Fleming | A01K 13/006 119/850 |
| 7,044,087 B1 | 5/2006 | Brecheen | |
| 7,165,344 B2 * | 1/2007 | Blackwell | A43B 1/0036 36/134 |
| 7,566,329 B2 * | 7/2009 | Rosenfeld | A61F 13/15203 604/385.01 |
| 7,607,407 B1 | 10/2009 | Blanch | |
| D685,086 S * | 6/2013 | Lutz | D24/124 |
| D809,735 S * | 2/2018 | Venosi | D99/5 |
| 2008/0023120 A1 * | 1/2008 | Rochman | A47G 11/004 156/60 |
| 2014/0007820 A1 * | 1/2014 | Lenz | A01K 23/00 119/869 |
| 2015/0137035 A1 * | 5/2015 | Ito | B01J 20/3268 252/194 |
| 2016/0113240 A1 * | 4/2016 | Cherubini | A01K 13/007 119/850 |
| 2016/0157534 A1 * | 6/2016 | Jorge | A41D 13/1169 128/863 |

(Continued)

FOREIGN PATENT DOCUMENTS

GB    2405779 A  *  3/2005  ............. A01K 23/00

*Primary Examiner* — Ebony E Evans
(74) *Attorney, Agent, or Firm* — R. Keith Harrison (57) ABSTRACT

Strapless animal chastity methods for maintaining chastity of a female animal may include obtaining a strapless animal chastity device having a device panel and at least one adhesive strip on the device panel; applying the at least one adhesive strip on the device panel against the hind section below the tail and the anus of the animal; and deploying the device panel from the at least one adhesive strip in a downward, covering or shielding configuration over the genital area on the animal.

11 Claims, 6 Drawing Sheets

(56) References Cited

U.S. PATENT DOCUMENTS

2017/0055496 A1\* 3/2017 McHugh .............. A61D 17/008
2017/0112210 A1\* 4/2017 McVarish .............. A45C 13/02
2017/0172218 A1\* 6/2017 Khan ...................... A61L 15/40

\* cited by examiner

STRAPLESS ANIMAL CHASTITY METHODS AND DEVICES

FIELD

Illustrative embodiments of the disclosure relate to methods and devices for maintaining the chastity of animals. More particularly, illustrative embodiments of the disclosure relate to strapless animal chastity methods and devices in which an adhesive device panel may be applied to the hind section of a female animal to maintain the chastity of the animal by covering or shielding the genital area of the animal and preventing the animal from engaging in sexual intercourse.

SUMMARY

Illustrative embodiments of the disclosure are generally directed to strapless animal chastity methods for maintaining chastity of a female animal. An illustrative embodiment of the strapless animal chastity methods may include obtaining a strapless animal chastity device having a device panel and at least one adhesive strip on the device panel, applying the at least one adhesive strip on the device panel against the hind section below the tail and the anus of the animal and deploying the device panel from the at least one adhesive strip in a downward, covering or shielding configuration over the genital area on the animal.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
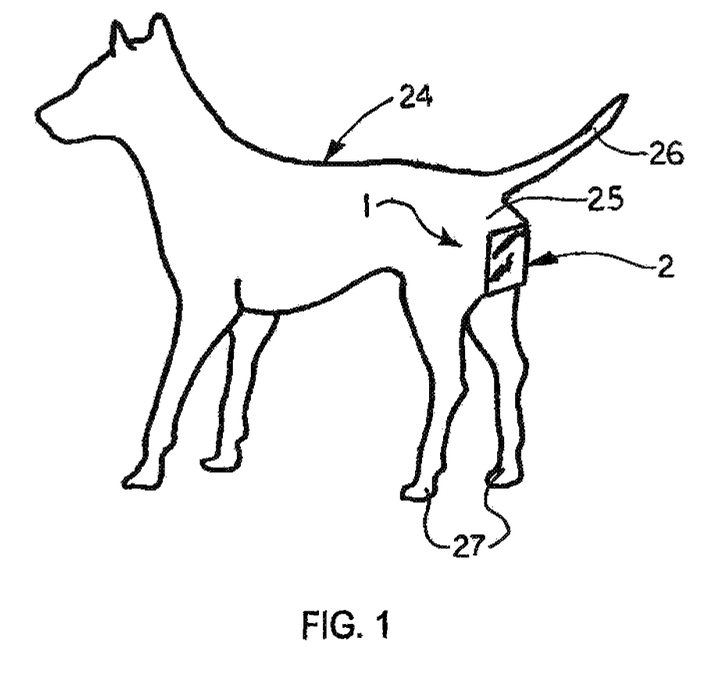
FIG. 1 is a rear perspective view of an illustrative embodiment of the strapless animal chastity devices, deployed in place on the hind section of a female animal in typical application of the animal chastity devices.
Figure 2:
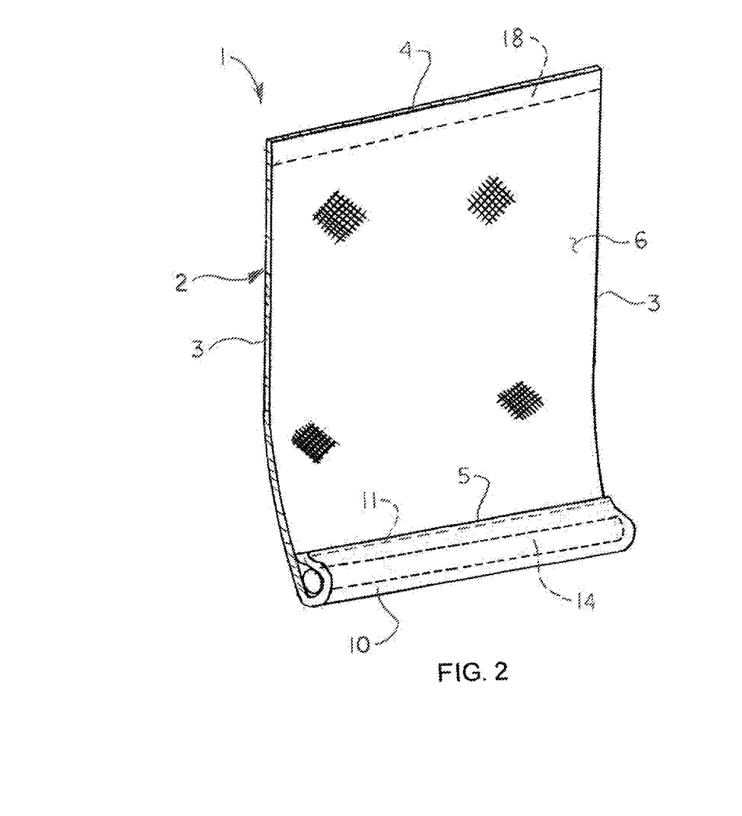
FIG. 2 is a rear perspective view of an illustrative embodiment of the strapless animal chastity devices.
Figure 3:
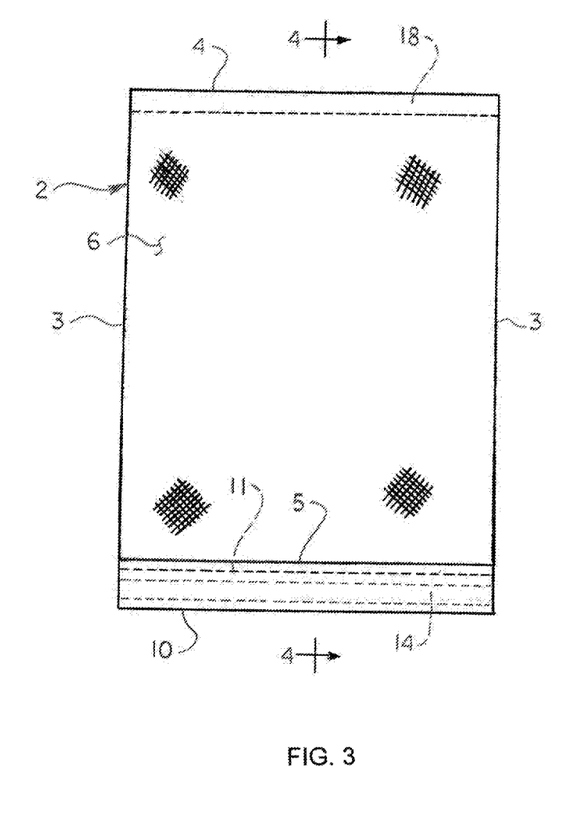
FIG. 3 is a rear view of the illustrative strapless animal chastity device illustrated in FIG. 2.
Figure 4:
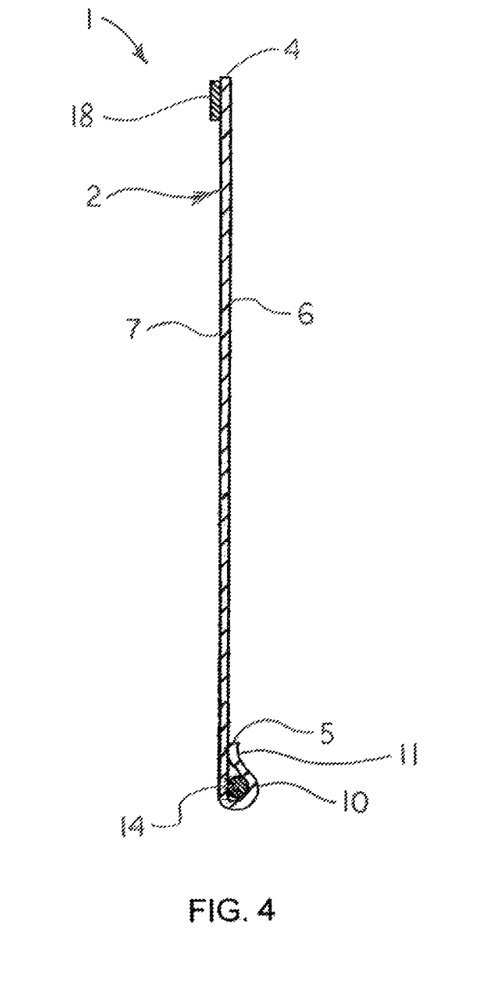
FIG. 4 is a sectional view, taken along section lines 4-4 in FIG. 3, of the illustrative strapless animal chastity device.
Figure 5:
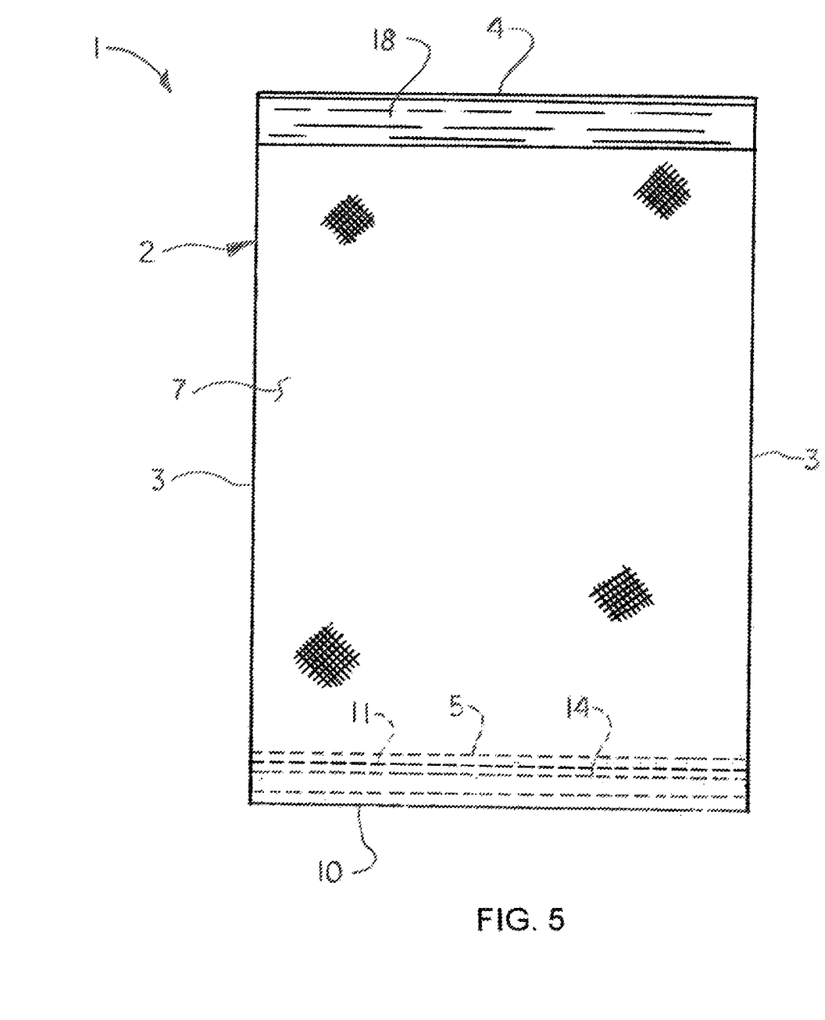
FIG. 5 is a front view of the illustrative strapless animal chastity device illustrated in FIG. 2.
Figure 6:
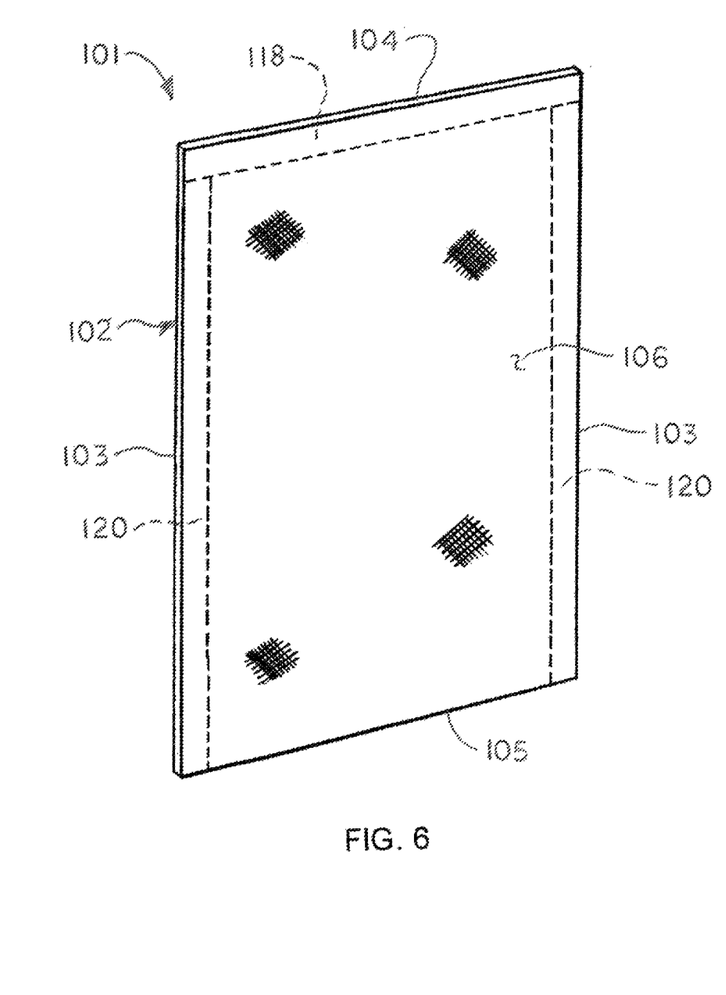
FIG. 6 is rear perspective view of an alternative illustrative embodiment of the strapless animal chastity devices.
Figure 7:
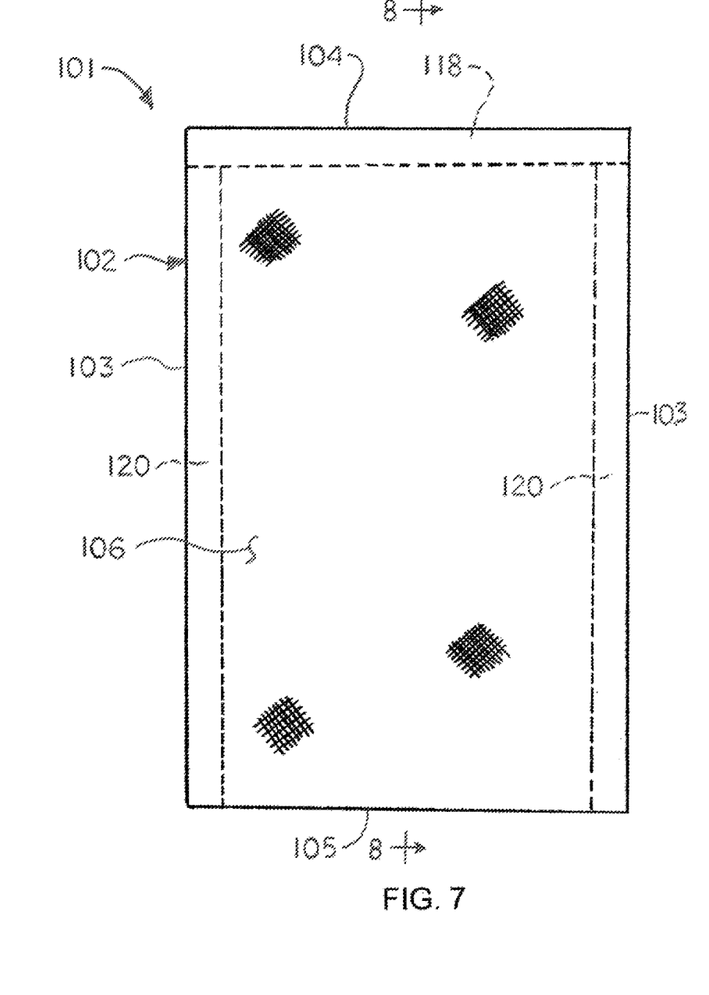
FIG. 7 is a rear view of the illustrative strapless animal chastity device illustrated in FIG. 6.
Figure 8:
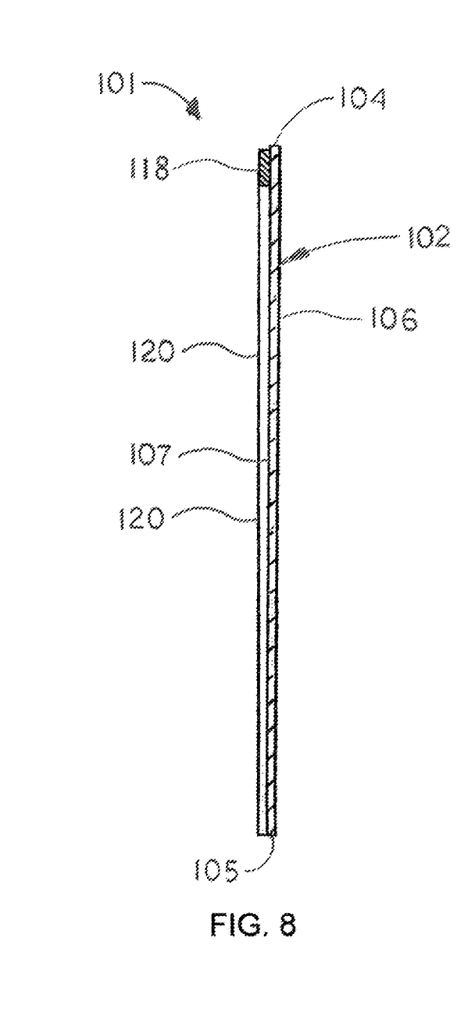
FIG. 8 is a sectional view, taken along section lines 8-8 in FIG. 7, of the illustrative strapless animal chastity device.
Figure 9:
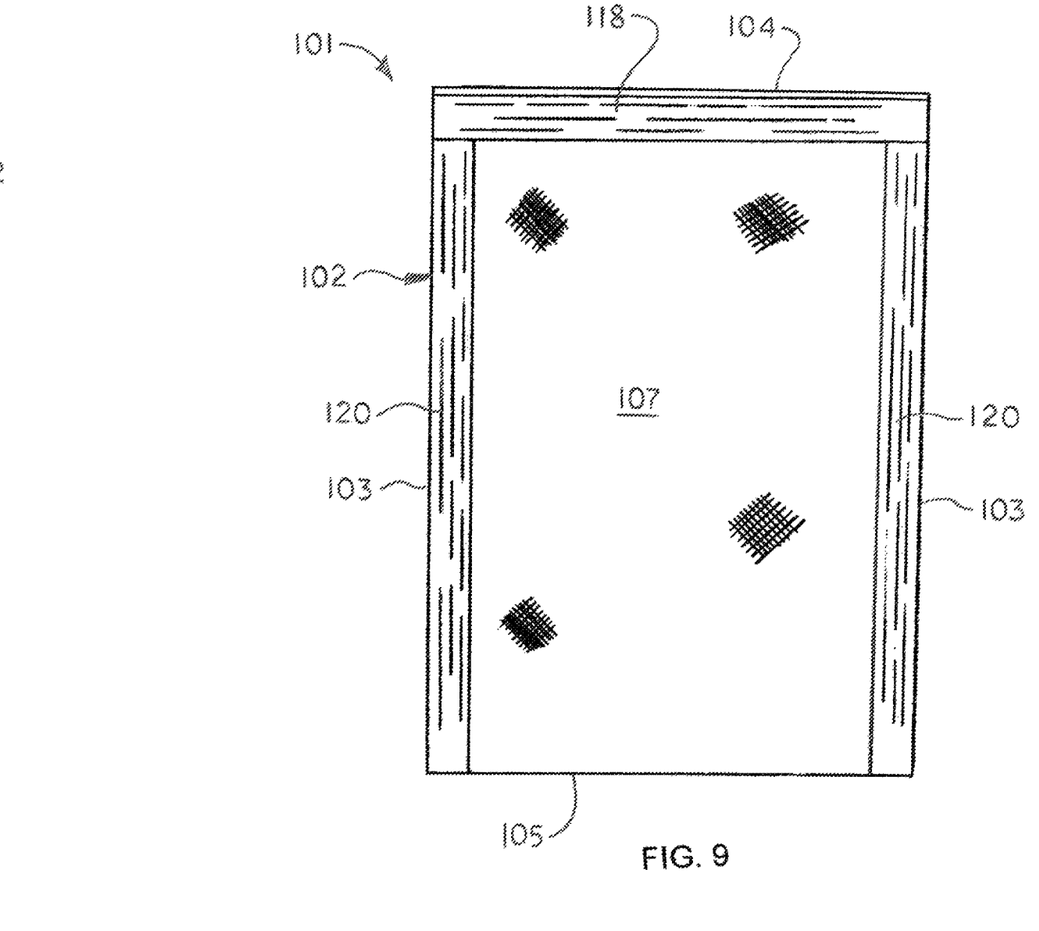
FIG. 9 is a front view of the illustrative strapless animal chastity device illustrated in FIG. 6.

Referring initially to FIG. 1 of the drawings, an illustrative embodiment of the strapless animal chastity devices, hereinafter device, of the disclosure is generally indicated by reference numeral 1. In typical application, which will be hereinafter described, the device 1 may be deployed on the hind section 25 of a female animal 24 such as a dog, for example and without limitation, to maintain the chastity of the animal 24 by covering or shielding the genital area of the animal 24 and preventing the animal 24 from engaging in sexual intercourse. The device 1 may be easily applied to and removed from the hind section 25 of the animal 24 without the need to use straps or harnesses or the like for the purpose.

Referring next to FIGS. 2-5 of the drawings, the device 1 may include a device panel 2. In some embodiments, the device panel 2 may have a solid construction. In other embodiments, the device panel 2 may have a mesh construction. The device panel 2 may be fabricated of a synthetic polymer such as NYLON™ and/or other natural or synthetic fabric material.

At least one adhesive strip 18 may be provided on the device panel 2. The adhesive strip 18 may facilitate detachable attachment of the device panel 2 to the hind section 25 of the animal 24, typically as illustrated in FIG. 1 and will be hereinafter described. The adhesive strip 18 may include glue and/or other adhesive material which is known by those skilled in the art and suitable for the purpose. For example and without limitation, in some embodiments, the adhesive strip 18 may include a commercially-available elongated strip of adhesive material (not illustrated) which may be applied to the device panel front surface 7 of the device panel 2. A backing strip (not illustrated) may be applied over the adhesive material to temporarily cover the adhesive material. The backing strip may be removed from the adhesive material before application of the device panel 2 to the hind section 25 of the animal 24.

In some embodiments, the device panel 2 of the device 1 may be generally elongated and rectangular, as illustrated. Accordingly, the device panel 2 may have a pair of elongated, parallel, spaced-apart device panel side edges 3. A device panel upper edge 4 and a device panel lower edge 5 may extend between the device panel side edges 3. A device panel rear surface 6 and a device panel front surface 7 may be bounded by the device panel side edges 3, the device panel upper edge 4 and the device panel lower edge 5. In some embodiments, the adhesive strip 18 may be provided on the device panel front surface 7 and may extend along and parallel to the device panel upper edge 4 of the device panel 2.

As further illustrated in FIGS. 2-5, in some embodiments, at least one panel weight 14 may be provided on the device panel 2 to weight the device panel 2 and maintain the device panel 2 in a downward, functional configuration on the animal 24 in which the device panel 2 covers or shields the genital area of the animal 24. The panel weight 14 may be attached to the device panel 2 according to the knowledge of those skilled in the art. Accordingly, in some embodiments, at least one weight loop 10 may be fabricated, formed or otherwise provided in the device panel 2. The panel weight 14 may be disposed in the weight loop 10. In some embodiments, the weight loop 10 may be formed by bending or looping the device panel lower edge 5 of the device panel 2 and attaching the device panel lower edge 5 to the device panel 2 such as via weight loop stitching 11.

Referring again to FIG. 1 of the drawings, in typical application of the device 1, the device panel 2 may be applied to the hind section 25 of the female animal 24 to maintain the chastity of the animal 25 by covering or shielding the genital area of the animal 25 and preventing the animal 25 from engaging in sexual intercourse. Accordingly, the adhesive strip 18 (FIGS. 2-5) on the device panel 2 may initially be exposed typically by removing the backing strip (not illustrated) from the underlying adhesive material of the adhesive strip 18. The exposed adhesive strip 18 may then be applied to the hind section 25 of the animal 24 typically in the area below the tail 26 and the anus (not illustrated). The device panel 2 may hang downwardly between or behind the hind legs 27 of the animal 24. Accordingly, the device panel 2 extends over and covers, shields or blocks the genital area of the animal 24 such that a male animal (not illustrated) is incapable of mounting and engaging in sexual intercourse with the animal 24. In some embodiments, the panel weight or weights 14 may impart weight to the device panel 2 which maintains the device panel 2 in the downwardly suspended or deployed, functional configuration over the genital area of the animal 24. In some applications, it may be necessary or desirable to shave the area on the animal 24 to which the adhesive strip 18 is to be applied prior to applying the adhesive strip 18 to the animal 24 in order to achieve optimum adherence of the adhesive strip 18 to the area.

After use, the device panel 2 can be removed from the hind section 25 of the animal 24 by detaching the adhesive strip 1 from the animal 24. The device 1 may be discarded or reused.

Referring next to FIGS. 6-9 of the drawings, an alternative illustrative embodiment of the animal chastity devices is generally indicated by reference numeral 101. In the device 101, elements which are analogous to the respective elements of the device 1 that was heretofore described with respect to FIGS. 1-5 are designated by the same respective numerals in the 101-199 series in FIGS. 6-9. An upper adhesive strip 118 may be provided on the device panel front surface 107 typically along and adjacent to the device panel upper edge 104 of the device panel 102. A pair of spaced-apart side adhesive strips 120 may be provided on the device panel front surface 107 of the device panel 102. The side adhesive strips 120 may extend along and parallel to the respective device panel side edges 103 of the device panel 102. Each of the side adhesive strips 120 may have a design which is the same as or similar to that of the adhesive strip 18 of the device 1.

Application of the device 101 may be as was heretofore described with respect to the device 1 in FIG. 1. The side adhesive strips 120 may be applied to the hind section 25 of the animal 24 to maintain the device panel 2 in the downwardly deployed, functional configuration over the genital area on the animal 24. After use, the adhesive strip 118 and the side adhesive strips 120 may be detached from the hind section 25 of the animal 24, and the device 101 may be discarded or subsequently reused.

Figure 10:
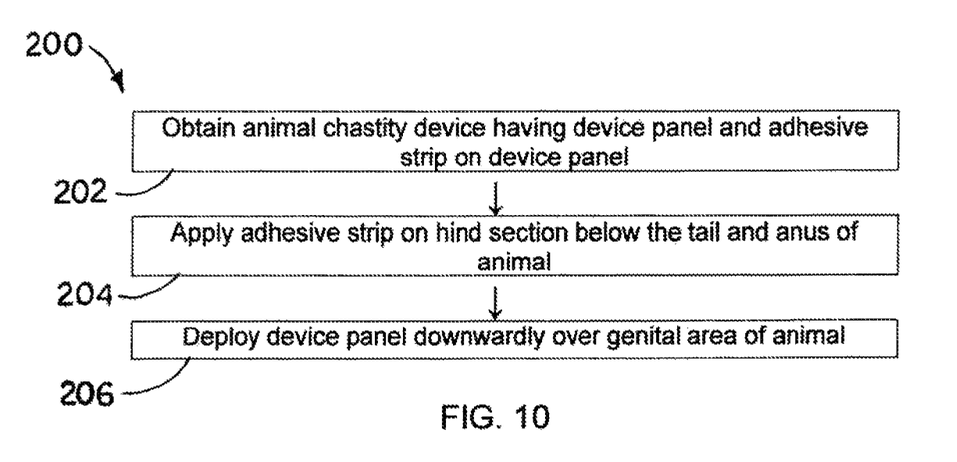
FIG. 10 is a flow diagram of an illustrative embodiment of the strapless animal chastity methods.

Referring next to FIG. 10 of the drawings, a flow diagram 200 of an illustrative embodiment of the strapless animal chastity methods is illustrated. At Step 202, a strapless animal chastity device may be obtained. The strapless animal chastity device may include a device panel.

At least one adhesive strip may be provided on the device panel.

At Step 204, the adhesive strip on the device panel may be applied to the area below the tail and the anus on the hind section of the animal.

At Step 206 the device panel may be deployed downwardly in a functional configuration between or behind the hind legs of the animal and covering or shielding the genital area of the animal. In some applications, the device panel may be weighted to maintain the device panel in the downwardly suspended, functional position. In other applications, the device panel may be adhesively applied to the hind section of the animal to maintain the device panel in the functional position. After use, the device panel may be detached and removed from the animal and discarded or subsequently reused.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A strapless animal chastity method for maintaining chastity of a female animal, comprising:
   obtaining a strapless animal chastity device having a device panel and at least one adhesive strip on the device panel;
   applying the at least one adhesive strip on the device panel against the hind section below the tail and the anus of the animal;
   deploying the device panel from the at least one adhesive strip in a downward, covering or shielding configuration over the genital area on the animal;
   maintaining the device panel in the downward, covering or shielding configuration by weighting the device panel of the animal chastity device; and
   wherein the weighting the device panel of the animal chastity device comprises providing at least one weight loop in the device panel and providing at least one weight in the at least one weight loop.

2. The strapless animal chastity method of claim 1 wherein the obtaining a strapless animal chastity device having a device panel and at least one adhesive strip on the device panel comprises obtaining a strapless animal chastity device having a solid device panel and at least one adhesive strip on the solid device panel.

3. The strapless animal chastity method of claim 1 wherein the obtaining a strapless animal chastity device having a device panel and at least one adhesive strip on the device panel comprises obtaining a strapless animal chastity device having a mesh device panel and at least one adhesive strip on the mesh device panel.

4. The strapless animal chastity method of claim 1 wherein the obtaining a strapless animal chastity device having a device panel and at least one adhesive strip on the device panel comprises obtaining a strapless animal chastity device including a rectangular device panel having a pair of device panel side edges and a device panel upper edge and a device panel lower edge extending between the device panel side edges, and at least one adhesive strip on the device panel at the device panel upper edge.

5. The strapless animal chastity method of claim 1 wherein the obtaining a strapless animal chastity device having a device panel and at least one adhesive strip on the device panel comprises obtaining a strapless animal chastity device having a synthetic polymer device panel and at least one adhesive strip on the device panel.

6. A strapless animal chastity method for maintaining chastity of a female animal, consisting essentially of:
- obtaining a strapless animal chastity device having a device panel and at least one adhesive strip on the device panel;
- applying the at least one adhesive strip on the device panel against the hind section below the tail and the anus of the animal;
- deploying the device panel from the at least one adhesive strip in a downward, covering or shielding configuration over the genital area on the animal;
- maintaining the device panel in the downward, covering or shielding configuration by weighting the device panel of the animal chastity device; and
- wherein the weighting the device panel of the animal chastity device comprises providing at least one weight loop in the device panel and providing at least one weight in the at least one weight loop.

7. The strapless animal chastity method of claim 6 wherein the obtaining a strapless animal chastity device having a device panel and at least one adhesive strip on the device panel comprises obtaining a strapless animal chastity device having a solid device panel and the at least one adhesive strip on the solid device panel.

8. The strapless animal chastity method of claim 6, wherein the obtaining a strapless animal chastity device having a device panel and at least one adhesive strip on the device panel comprises obtaining a strapless animal chastity device having a mesh device panel and the at least one adhesive strip on the mesh device panel.

9. The strapless animal chastity method of claim 6 wherein the obtaining a strapless animal chastity device having a device panel and at least one adhesive strip on the device panel comprises obtaining a strapless animal chastity device having a rectangular device panel including a pair of device panel side edges and a device panel upper edge and a device panel lower edge extending between the device panel side edges, and the at least one adhesive strip on the device panel at the device panel upper edge.

10. The strapless animal chastity method of claim 6 wherein the obtaining a strapless animal chastity device having a device panel and at least one adhesive strip on the device panel comprises obtaining a strapless animal chastity device having an upper adhesive strip and a pair of side adhesive strips on the device panel, and applying the at least one adhesive strip on the device panel against the hind section below the tail and the anus of the animal comprises applying the upper adhesive strip against the hind section below the tail and the anus of the animal, and further comprising maintaining the device panel in the downward, covering or shielding configuration by applying the pair of side adhesive strips on the device panel against the hind section of the animal.

11. The strapless animal chastity method of claim 6 wherein the obtaining a strapless animal chastity device having a device panel and at least one adhesive strip on the device panel comprises obtaining a strapless animal chastity device having a synthetic polymer device panel and the at least one adhesive strip on the device panel.

\* \* \* \* \*